United States Patent Office 2,955,042
Patented Oct. 4, 1960

2,955,042

METHOD OF CURING MEAT AND COMPOSITION THEREFOR

Frank Howard Firor, Pelham, and Jean E. Hanache, Old Westbury, N.Y., assignors to Williams-McWilliams Industries, Inc., a corporation of Delaware No Drawing. Filed Apr. 3, 1957, Ser. No. 650,309

10 Claims. (Cl. 99—159)

This invention relates to the curing of meat and more particularly to the production of a processed meat free from added sodium salt.

It is well known that many people having certain cardiac and renal conditions must, or should, refrain from partaking of common salt. It is generally agreed that the deleterious action of common salt (NaCl) in the systems of those people is due to the sodium in the form of sodium ions which should be specifically avoided. But taking away the seasoning imparted to food by common table salt deprives the food of the taste or savor which is associated with palatability. Many people, who should refrain from eating foods containing, or seasoned with, common salt (NaCl) crave the taste that the salt imparts to the food and hence, for lack of a suitable substitute which is free from the sodium ions, continue to consume the foods seasoned with common salt or else they must be satisfied to eat food which is not as palatably seasoned.

While there are a number of so-called substitutes for common salt to be added as seasoning to food and irrespective of their relative ratings as to similarity in taste to the real thing, still they fall short of meeting all the problems which arise in the field of foods.

There is, for example, a need for processed meats which are salt-free but in the field of cured or processed meats, such as boiled, smoked, and cooked canned hams, frankfurters or sausage type meat, as examples, the consumer has come to associate color as well as a certain characteristic salty-like taste with palatability of this type of cured meat. Hence, as a practical matter it is of great importance, for commercial acceptance by the trade that processed ham products that are salt-free (free of added sodium ions) not only have the salty-like taste, characteristic of processed ham, but also a color normally associated in the consumer's mind with processed ham (smoked or boiled). This color is well known and recognized by meat packers skilled in the art of meat processing and is generally, and also herein, referred to as the "cured pink color."

The aim of curing meats, such as hams, as it is at present generally practiced commercially, is to produce an acceptable cured pink colored meat with an acceptable palatable salty-like flavor or taste which is normally associated with cured or processed meat of this kind. To achieve this purpose it is, generally speaking, the practice of meat packers or processors to use a mixture of ingredients in the treatment or curing of the meat which are harmless to humans when the cured meat is eaten. The ingredients most commonly used at present are: sodium chloride (common table salt), sugars, nitrate and/or nitrite of sodium or potassium, phosphate salts, hydrolyzed vegetable protein and ascorbic acid or its salts. The ingredients are used in varying proportions and in various combinations. Seldom do two packing plants have identical mixtures of the same combination or the same proportion.

Each of the above mentioned ingredients contributes a share to one or more functions of curing. The desirable salty-like sweet-like palatable taste is primarily contributed by the sodium chloride and sugars, the desired pink color development is contributed by the nitrite and nitrate salts, while holding of the developed pink color is mainly attributable to the sugar and ascorbate. Preservation and stabilization of the pink color is obtained by subjecting the meat to some type of heating, such as, smoking, boiling, or other type of cooking. But in these conventional meat curing combinations there is employed common salt (NaCl) which is relied upon to impart to the processed meat the desired salty-like taste, associated with palatability.

To use the conventional curing ingredients, it has been general practice to dissolve the chosen ingredients in water to make a solution or brine, which in the parlance of the meat packing trade is called a "pickle" solution. A predetermined or definite amount of the pickle of a known concentration is used for treating the meat and this treatment may be carried out in various ways. A definite amount of pickle solution may be pumped into the meat through one of the larger blood vessels or it may be pumped directly into the meat through hollow needles pierced into it; this being known in the trade as stitch pumping. Or the meat may be immersed in a bath of the pickle solution for a desirable length of time for the pickle to penetrate into the meat. Or a combination of these methods may be employed. In some instances the ingredients may be used dry and rubbed into the meat that is to be cured.

It will be understood that the foregoing has reference to operations in which solid pieces of meat, such as hams, bellies, or pieces of other kinds of meat like beef are used. But when curing sausage type meat such as frankfurters or bologna, the curing ingredients are either added in dry form to the comminuted meat or dissolved in some water and then added to it and it will be understood that our invention lends itself to producing a processed meat by employing a pickle solution or by employing the curing ingredients in dry form.

Our invention provides a way of producing a processed or cured meat which is free from added sodium salt (or sodium ions), the curing ingredients employed being such that the development and stabilization of the cured pink color is not hindered and at the same time there is imparted to the meat the desirable salty-like taste which is associated with palatability; that is, a salty-like taste comparable to that imparted to processed meat which has been cured with well known conventional curing ingredients or pickle containing common salt (NaCl).

In accordance with our process the meat may be processed by following substantially the same procedural steps which have heretofore been used when employing the conventional curing ingredients, whether in solution or in dry form, but the ingredients are different and the pickle used is different in that the use of any salt, or other ingredient, containing sodium ions, is wholly eliminated and avoided. Consequently, the finished meat product is free from added sodium ions. That is, in common parlance, it is "salt free"; it being understood, however, that when speaking technically and with greater accuracy, it should be said that the meat is free from added sodium-ion-salt.

The formulation of the curing agent or pickle for practicing our process preferably comprises a combination of choline or choline chloride, potassium chloride, sodium-free nitrite and/or nitrate salts, sodium-free hydrolyzed protein with or without the addition of sodium-free phosphate or ascorbic acid or its sodium-free salts. It may be noted here that the ingredients employed by us whether in dry form or in a pickle solution, are characterized, first, by the elimination of any salt or other ingredient containing sodium ions, and second, by utilizing a combination of choline chloride or other suitable salt of choline, (or choline) and potassium chloride or other suitable food grade chloride salt which is sodium free in the curing mixture, in lieu of common salt (NaCl); it being understood that the other conventional curing agents, such as, sugar, nitrate and nitrite (sodium-free), ascorbic acid, and hydrolyzed vegetable protein (sodium-free) are employed as in the conventional way. We prefer to use choline in the form of choline chloride but in case it is desired to start with choline, as distinguished from choline chloride, the chloride ion may otherwise be added to the pickle in a chloride salt (free from sodium ion) such as, potassium chloride, to form choline chloride.

Although the novel features which are believed to be characteristic of the invention will be pointed out in the annexed claims the invention itself as to its objects and advantages and the manner in which it may be carried out may be better understood from the following more detailed description in which specific examples of our process are set forth. And while the invention is applicable to all kinds of cured processed meats which are cured to impart to them a salty-like cured taste, such as smoked, boiled or canned cooked ham or bacon; corned beef, frankfurters and sausage type meats; it will be described particularly as applied to the production of smoked and boiled ham and bacon.

In the preferred way of practicing our process, in providing processed ham, for example, we dissolve the various curing ingredients in water to make a solution (called a "pickle" solution) and pump a certain amount of the pickle into the meat, and then place the meat in a container and cover it with the pickle solution and keep it immersed for a period of about five to six days at the end of which time the meat is removed, washed, boned and trimmed of excessive fatty tissues. We then subject the so treated meat to a cooking step. That is, the meat is then subjected to the heat of smoking if smoked ham is the desired ultimate product or boiled if the ultimate product desired is boiled ham. After the cooking step the meat is handled in conventional manner. It may be packaged as other processed meats or otherwise handled through the channels of trade in conventional manner. In other words the meat may be handled, so far as procedural steps are concerned, in the same way as meat is handled when it is cured by using the conventional pickle.

In preparing the pickle solution we employ, as essential ingredients, choline or a compound of choline, in the form of a salt, such as choline chloride; potassium chloride or other comparable chloride salt free from sodium; and sugar to impart the desired salty-like sweet-like taste to the meat, and a nitrate or nitrite salt (free from sodium) to impart the desired cured pink color. If desired, additional ingredients may be added to the pickle or to the meat such as ascorbic acid or its salts, hydrolyzed vegetable protein, and certain phosphate salts for water retention or color preservation. It will be understood, of course, that no ingredients are added to the pickle solution which would impart added sodium or sodium ions to the meat.

Example I

Pieces of ham were cured in a pickle solution made up in the proportions stated, per 100 gallons of water, as follows:

| | | |
|---|---|---|
| Potassium chloride | lbs | 40 |
| Choline chloride | lbs | 7 |
| Sucrose | lbs | 33.3 |
| Potassium nitrite | oz | 13.3 |
| Potassium nitrate | oz | 16 |
| Ascorbic acid | oz | 16 |
| Monopotassium glutamate | oz | 33.3 |

The meat was treated by pumping a part of the pickle solution into the meat. This amounts to about 8% to 10% of the weight of the meat. The meat was then immersed in the solution for six days and the temperature maintained at about 38°–42° F. as in the standard procedural steps when meat is cured in the conventional pickle solution. It was removed, and trimmed and a part of the meat was smoked in accordance with standard practice, and a part of it was boiled according to standard practice. It was then cooled, stored, observed, and tested from time to time for taste, color and keeping qualities over a period of 2 to 3 weeks.

Example II

Pieces of ham were cured in like manner as in Example I, except that the curing pickle solution contained 10 lbs. of choline chloride per 100 gal. of water instead of 7 lbs., the proportion of other ingredients remaining the same as in Example I. The treated meat was cooked and examined in like manner as in Example I.

Example III

Pieces of ham were cured, cooked and examined in like manner as in Example I except that the pickle solution contained 20 lbs. of choline chloride per 100 gal. of water, instead of 7 lbs. as in Example I.

Example IV

Pieces of ham were cured, cooked and examined in like manner as in Example I except that the pickle solution contained 32 lbs. of choline chloride instead of 7 lbs. per 100 gal. of water as in Example I.

The results of Examples I, II, III, IV were that the cured pink color was developed and the color stability was good. The flavor varied somewhat from the difference in formulation of the pickle solutions, but the flavor, on the whole could be considered satisfactory. That is, the meat had a salty-like sweet flavor, comparable to that of smoked and boiled ham processed in conventional manner. These tests indicated that even better results might be obtained by reducing the relative amount of potassium chloride. The processed meats of Examples I and II were somewhat different in taste from the others, and might be considered by some as not near enough to conventionally treated meat for best sales appeal to the consuming public. While the meats of Example III were not so mild as II, it was still not so salty-like in taste as might be desired. Example IV came nearest to being the characteristic salty-like taste associated with processed ham cured and treated in conventional manner and available in the market.

Example V

Pieces of ham were cured as described above in Example I in a pickle solution made up of ingredients and in proportions per 100 gallons of water as follows:

| | | |
|---|---|---|
| Potassium chloride | lbs | 30 |
| Choline chloride | lbs | 40 |
| Sucrose | lbs | 33.3 |
| Potassium nitrite | oz | 13.3 |
| Potassium nitrate | oz | 16 |
| Ascorbic acid | oz | 16 |
| Monopotassium glutamate | oz | 33.3 |

The meat after immersion in the pickle for a period of six days, was removed, trimmed and a part of it was smoked and a part of it was boiled according to standard practice. It was then cooled, and examined from time to time for taste, texture, color, and color stability. Its color and color stability were good and the flavor satisfactory; having the salty-like sweet taste of processed ham cured in the standard commercial pickle containing sodium chloride. The tests and observations were conducted by a panel of persons experienced in producing processed meats. Some voted the meat treated as set forth in Example V as preferable to meat cured in the conventional pickle in which sodium-chloride is used.

In other tests conducted in the course of our investigations we found that if the amount of potassium chloride in the pickle was increased much beyond 40 lbs. per 100 gal. of water, that the resultant processed meat tended to be harsh or bitter and generally unsatisfactory and if an amount of less than 20 lbs. of potassium chloride per 100 gal. of water was used in the pickle the resultant processed meat was not entirely satisfactory. The amount of choline may vary over a range of wider limits. We prefer to use a pickle containing from 30 lbs. to 40 lbs. of potassium chloride and 30 lbs. to 40 lbs. of choline chloride, per 100 gal. of water, together with the usual amounts of other and conventional curing ingredients, including sugar, preferably 30 lbs. to 40 lbs.; potassium nitrite and nitrite, preferably the combined weights not exceeding about 2 lbs.; ascorbic acid, preferably not exceeding 20 ozs.; and monopotassium glutamate, about 2 lbs. and preferably not exceeding 36 ozs., as this produces a processed ham which, in taste and color, seems best suited for a product having the palatable tatse and color which the average consumer associates with high quality processed meat of this kind. It will be understood, however, that there may be some variance in the relative amounts of these ingredients dependent largely upon the color and mildness or intensity of taste desired in the final product.

The amount of potassium nitrate, and/or nitrite used in the pickle may be varied to develop the particular cured pink color desired, but, of course, the total amount of nitrate and nitrite should not go beyond that permitted by the regulations of the Meat Inspection Bureau having jurisdiction. This may be a State or local agency in the case of meat for intrastate sale or the Federal Agency for processed meats in interstate commerce.

*Example VI*

(a) Eight hams were cured in a pickle solution made up in the proportions stated, per 100 gallons of water, as follows:

| | | |
|---|---|---|
| Potassium chloride | lbs | 30 |
| Choline chloride | lbs | 43.3 |
| Sugar | lbs | 33.3 |
| Potassium nitrite | oz | 13.3 |
| Potassium nitrate | oz | 16.6 |
| Ascorbic acid | oz | 16.6 |
| Monopotassium glutamate | oz | 33.2 |

The meat, having the salt-like taste-imparting ingredients uniformly distributed throughout the mass of the meat, was then removed, washed, and trimmed. Half the meat was smoked in accordance with conventional standard practice and half was boiled in accordance with conventional standard practice. It was then cooled, stored and inspected from time to time for taste, color, and keeping qualities. The finished products had a satisfactory cured pink color and the color stability was good. The smoked ham had the salty-like taste and sweet savor associated with the palatable taste of smoked ham cured with a conventional pickle containing sodium chloride and the boiled ham had the taste and flavor associated with the palatable taste and flavor of boiled ham cured with a conventional pickle containing sodium chloride.

(b) Eight pork bellies were cured and treated in the same way as the eight hams in Example VI(a) except that no pickle solution was pumped into the bellies; the bellies being immersed in the solution for seven days. They were then removed, washed, trimmed and smoked. The resulting bacon had an excellent palatable, salty-like sweet taste, characteristic of bacon cured in conventional sodium chloride pickle and otherwise prepared in conventional manner.

*Example VII*

Eight hams and eight bellies were cured and processed in like manner as stated in Example VI(a) and (b), except that the curing pickle was made up in the proportions stated, per 100 gallons of water, as follows:

| | | |
|---|---|---|
| Potassium chloride | | None |
| Choline chloride | lbs | 100 |
| Sugar | lbs | 40 |
| Potassium nitrite | oz | 16 |
| Potassium nitrate | oz | 20 |
| Ascorbic Acid | oz | 20 |
| Monopotassium-glutamate | oz | 40 |

The finished processed meat products were satisfactory in color. Although it might be considered by some as satisfactory products, these products did not have a sufficiently salty-like taste that they could be characterized as having the palatable salty-like taste normally associated with processed ham or bacon cured with the conventional pickle containing sodium chloride.

It will be understood that choline may be used in the formulation instead of choline chloride as both choline and potassium chloride dissolve in the pickle solution and additional sodium-free chloride salt may be added to supply the chloride ion necessary to react with the choline to form choline chloride in situ.

It is known that in the case of the conventional pickle containing common salt that by varying the combination or the proportion of the ingredients or by using stronger or weaker concentrations of the mixture, the intensity of the salty-like taste can be controlled within commercially acceptable limits. Some may prefer a so-called mild cure while others may prefer a strong or more intense salty taste. By varying the concentration of choline chloride and potassium chloride within the preferred limits set forth above, or by varying the time of curing and temperature of the pickle solution the intensity of the salty-like taste of the ultimate processed meat product may be controlled, as in the case of curing meats in the conventional pickle.

Although the invention has been particularly described in the specific examples in connection with the use of aqueous pickle solutions in which the curing ingredients are dissolved and in which the meat may be immersed for curing, it will be understood that the invention also contemplates the use of the curing agents in dry form, according to procedural steps employed when the conventional ingredients containing sodium salts are employed. In the manufacture of frankfurters, or other sausage type meats, for example, the mixture of curing agents is mixed with the comminuted or ground meat and the meat is not immersed in a solution containing the curing agents. In producing the "dry cured" hams and bacon, the mixture of curing ingredients in dry form is "rubbed" into the meat. Our invention contemplates the use of a "dry curing mixture," as well as a pickle solution, free from sodium and containing a salt of choline in lieu of common salt, together with other sodium-free curing ingredients, for the purpose of curing the meat and imparting thereto the desired salty-like taste associated with palatability and the desired color to the finished meat products. For dry curing the ingredients are mixed in substantially the same proportion or ratio as the proportions set forth in the examples for the aqueous pickle solutions.

Throughout this specification, the term "salty-like" taste has been used and at the outset it has been defined as a "taste comparable to that imparted to processed meat which has been cured with well-known conventional curing ingredients or pickle containing common salt (NaCl)." In brief, this is intended to mean what is sometimes referred to as a "salty" taste. So it will be understood that the term "salty" taste as used in the claims means a taste comparable to the taste imparted to processed meat by the use of common salt.

The terms and expressions which have been employed herein are used as terms of description and not of limi-

What is claimed is:

1. The process of curing meat to impart thereto a cured color and a palatable salty taste, without using sodium chloride in said process, which comprises curing the meat with a sodium-free curing composition comprising a mixture of a choline salt, potassium chloride, and a small amount of sodium-free salt selected from the group consisting of nitrate, nitrite, and mixtures thereof, said selected salt being present in a sufficient amount to impart to the cured meat a color normally associated with processed meat, said choline salt and potassium chloride each being present in an adequate amount and in amounts relative to one another and relative to the time and temperature of cure to impart to the meat a salty taste comparable to that imparted by using sodium chloride in the curing composition.

2. In the manufacture of processed meat which is cured with a pickle to impart to the processed meat a palatable salty taste, the method of imparting to the meat a palatable salty taste, comparable to that imparted to the same kind of meat by curing it with a pickle containing sodium chloride, which comprises curing the meat with a pickle free from sodium and containing a mixture of choline chloride and potassium chloride in the proportion of 30 to 40 lbs. of choline chloride and 30 to 40 lbs. of potassium chloride per 100 gallons of water to impart to said meat said salty taste.

3. In the manufacture of processed meat which is cured with a pickle to impart to the processed meat a palatable salty taste, the method of imparting to the meat a palatable salty taste, comparable to that imparted to the same kind of meat by curing it with a pickle containing sodium chloride, which comprises curing the meat with an aqueous pickle solution free from sodium and containing, per 100 gallons of water, from 30 to 40 lbs. of choline chloride, 30 to 40 lbs. of potassium chloride to impart to said meat said salty taste, 30 to 40 lbs. of sugar, and small amounts of a sodium-free salt selected from the group consisting of alkali metal nitrate and nitrite, not exceeding about 2 lbs.

4. A process of producing a processed meat, free from added sodium ions and having a cured pink color and a palatable salty taste which comprises curing the meat with a pickle free from sodium salts and containing sugar, 30 to 40 pounds of choline chloride and 30 to 40 pounds of potassium chloride per 100 gallons of water and about 2 pounds of a salt mixture of potassium nitrate and potassium nitrite and about 2 pounds of monopotassium glutamate and about one pound of ascorbic acid.

5. The method of producing a processed meat which comprises curing the meat with a sodium-free pickle solution including the immersion of the meat for a period of about six days in a pickle solution containing as curing ingredients per 100 gallons of water, 30 to 40 pounds of sugar, 30 to 40 pounds of choline chloride, 30 to 40 pounds of potassium chloride, a mixture of potassium nitrate and potassium nitrite the combined weight of which does not substantially exceed 36 ozs., an amount of monopotassium glutamate not substantially exceeding 36 ozs., an amount of ascorbic acid not substantially exceeding 20 ozs., and after said period of immersion, removing said meat from said solution, then washing and trimming said meat and subjecting it to a cooking, thereby to produce a processed ham product free from added sodium chloride salt but having a comparable salty taste.

6. A meat curing composition comprising a mixture of sodium-free meat curing ingredients including a choline salt and potassium chloride in adequate amounts and in amounts relative to one another and relative to the time and temperature to be used in curing the meat therewith to impart to the meat cured therewith a salty taste comparable to that imparted to the meat when cured with conventional curing compositions containing sodium chloride.

7. A meat curing mixture for imparting to meat a salty taste comparable to that imparted to meat cured with conventional curing ingredients containing sodium chloride which comprises a mixture of sodium-free meat curing ingredients including choline chloride and potassium chloride in the ratio of 30 to 40 pounds of choline chloride to 30 to 40 pounds of potassium chloride.

8. A meat curing mixture for imparting to meat a salty taste comparable to that imparted to meat cured with a conventional pickle containing sodium chloride which comprises a mixture of sodium-free meat curing ingredients including a mixture of sugar, sodium-free nitrate and nitrite, choline chloride and potassium chloride, in the ratio of 30 to 40 pounds of choline chloride to 30 to 40 pounds of potassium chloride per 100 gallons of water.

9. A meat curing mixture for imparting to the meat a cured pink color and a salty taste comparable to that imparted to meat cured with a conventional pickle containing sodium chloride which comprises a mixture of potassium nitrate, potassium nitrite, choline chloride and potassium chloride, said ingredients being present in said mixture in amounts which when said mixture is dissolved in water said ingredients will be present in the solution in the ratio of a combined weight of about two pounds of nitrate and nitrite, 30 to 40 pounds of choline chloride, and 30 to 40 pounds of potassium chloride per 100 gallons of water.

10. A pickle solution for curing meat to impart thereto a salty taste comparable to that imparted to meat cured with a conventional pickle containing sodium chloride which comprises an aqueous solution containing curing ingredients in amounts, per 100 gallons of water, approximately as follows:

| | | |
|---|---|---|
| Potassium chloride | lbs | 30 |
| Choline chloride | lbs | 40 |
| Sucrose | lbs | 33.3 |
| Potassium nitrite | oz | 13.3 |
| Potassium nitrate | oz | 16 |
| Ascorbic Acid | oz | 16 |
| Monopotassium glutamate | oz | 33.3 |

References Cited in the file of this patent

UNITED STATES PATENTS

| | | |
|---|---|---|
| 2,553,533 | Komarik et al. | May 15, 1951 |
| 2,601,112 | Freedman | June 17, 1952 |
| 2,688,555 | Komarik et al. | Sept. 7, 1954 |
| 2,806,793 | Kemps | Sept. 17, 1957 |